United States Patent [19]

Igusa et al.

[11] Patent Number: 4,871,901
[45] Date of Patent: Oct. 3, 1989

[54] CONTROL DEVICE FOR A COFFEE ROASTER

[75] Inventors: Masaru Igusa, Takasaki; Takashi Chiba, Iseaski, both of Japan

[73] Assignee: Sanden Corporation, Japan

[21] Appl. No.: 878,353

[22] Filed: Jun. 25, 1986

[30] Foreign Application Priority Data

Jun. 26, 1985 [JP] Japan .............................. 60-95085[U]
Dec. 25, 1985 [JP] Japan ........................... 60-202172[U]

[51] Int. Cl.4 ............................................ F26B 11/04
[52] U.S. Cl. ................................... 219/400; 219/492; 34/48; 99/286
[58] Field of Search ............... 219/400, 412, 413, 385, 219/391, 482, 488, 490, 492; 34/57 O, 57 E, 48; 355/77; 99/286; 323/327

[56] References Cited

U.S. PATENT DOCUMENTS

| | | | |
|---|---|---|---|
| 3,392,626 | 7/1968 | Miller | 355/77 |
| 3,493,848 | 2/1968 | Galloway | 323/327 |
| 4,271,603 | 1/1981 | Moore | 99/286 |
| 4,308,853 | 1/1982 | Thirode | 126/21 |
| 4,316,078 | 2/1982 | Mack et al. | 219/386 |
| 4,325,191 | 4/1982 | Kumagai | 99/286 |
| 4,494,314 | 1/1985 | Gell | 34/48 |
| 4,587,745 | 5/1986 | Tanner | 34/95 |
| 4,692,597 | 9/1987 | Tsuda et al. | 219/492 |

Primary Examiner—A. D. Pellinen
Assistant Examiner—Leon K. Fuller
Attorney, Agent, or Firm—Banner, Birch, McKie & Beckett

[57] ABSTRACT

A coffee roasting apparatus is disclosed. The coffee roasting apparatus comprises a cylindrical container, a cylindrical drum rotatably extended within the center portion of the container, and a heater element diposed within the drum. The apparatus includes a blower device to cause air circulation within the interior of the container to more uniformily heat the beans. The heater element is controlled by a control device to reduce the calorific value of the heater element when the temperature of the container reaches a predetermined temperature. Therefore, abnormal temperature in the container is prevented, while the roasting operation is speedily done. A control device for the blower device is also disclosed which will vary the speed of the blower in response to changes in the input voltage. In this way, an increase in the input voltage which may have caused unwanted overheating is avioded by a corresponding increase in air circulation.

15 Claims, 4 Drawing Sheets

CONTROL DEVICE FOR A COFFEE ROASTER

BACKGROUND OF THE INVENTION

This invention relates to a coffee roaster, and more particularly, to a control device for controlling the roasting temperature of a coffee roaster.

There are two common methods of roasting coffee, a hot blast method and a heat radiation method. When using either method, the coffee beans should be roasted within a very short time period to produce high quality coffee beans. Therefore, coffee roasters use heater elements with large calorific values for quickly roasting the coffee beans. However, since coffee roasters are not provided with a device for controlling the calorific value of the heater element, the temperature in the roaster may abnormally increase and the outer skin of the coffee bean may burn.

Some roasters are equipped with devices for more uniformly roasting the coffee beans, for example, a stirring element or a blower device to control the flow of air into the roaster. Thus, heat is more uniformly distributed to each coffee bean due to the stirring of the beans and air circulation caused by the blower element. However, the calorific value of the heater element proportionally changes in accordance with changes in the power source voltage so that the amount of heat absorbed by each coffee bean within a predetermined time period may change. As a result of variations in the heating of the beans, the roasting condition changes thereby making it difficult to control the degree to which each bean is roasted.

SUMMARY OF THE INVENTION

The primary object of the invention is to provide an improved coffee roaster in which the roasting degree of the beans can be accurately controlled.

Another object of the invention to provide a coffee roaster with a heater element that can be automatically controlled.

A further object of the invention is to provide a coffee roaster with a heater element that is not affected by variations in the power supply.

A further object of the invention is to provide a coffee roaster with a blower device that can be controlled to vary the rate at which air is circulated within the device.

A still further object of the invention is to provide a coffee roaster which is protected from damage due to abnormal increases in the temperature of the roaster.

A coffee roasting apparatus in accordance with the present invention includes a cylindrical container which contains the coffee beans during a roasting operation, a heater element to heat the coffee beans, and a blower fan device to control air circulation within the container. The calorific value of the heater element is controlled by a control device so that the calorific value of the heater element may be reduced when the temperature in the container reaches a predetermined temperature. The speed of the blower device is also adjusted to more accurately control the roasting operation.

Further objects, features and other aspects of the invention will be understood from the following detailed description of a preferred embodiment of the invention with reference to the attached drawings.

DETAILED DESCRIPTION

Figure 1:
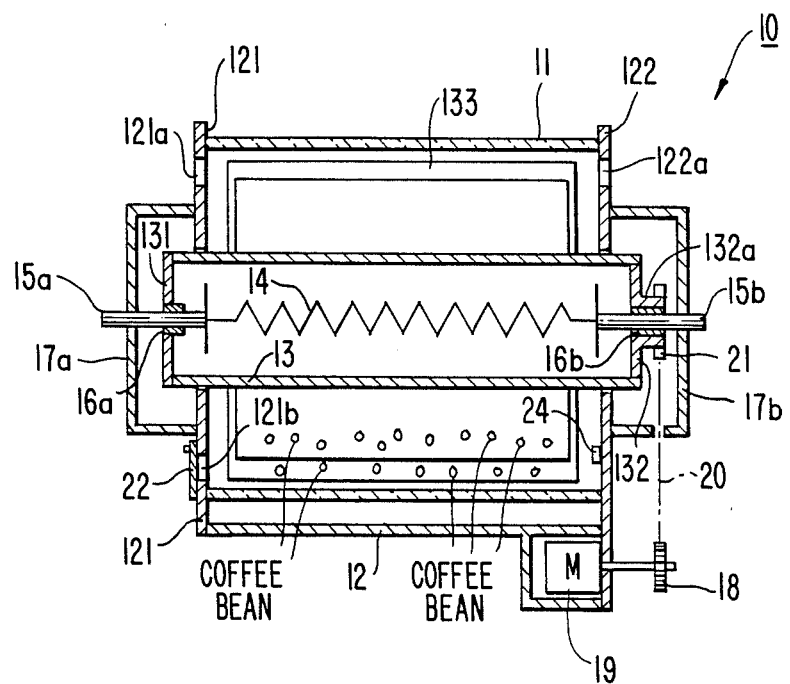
FIG. 1 is a cross sectional view illustrating a roasting apparatus according to the present invention.

Referring to FIG. 1, a coffee roasting device in accordance with the present invention is shown. The roasting device 10 comprises a cylindrical container 11 functioning as a roasting drum, a support frame 12 and a cylindrical drum 13 in which a heater element 14 is disposed.

Cylindrical container 11 is formed of a transparent material with heat resisting characteristics, for example, a glass material, and both end openings of the container 11 are covered by end plates 121, 122 of support frame 12, respectively. Cylindrical drum 13 is formed of a porous material such as a wire mesh and horizontally extends within the center portion of cylindrical container 11 and penetrates through each of end plates 121, 122. A plurality of blades 133 project radially outward from the outer peripheral surface of drum 13 and abut close to the inner peripheral surface of container 11. Both end openings of drum 13 are covered by closed plates 131, 132, each of which is rotatably supported on a fixed shaft 15a, 15b through bearings 16a, 16b. Each fixed shaft 15a, 15b is fixedly supported on a supporting frame 17a, 17b, each of which is fastened on the surface of end plate 121, 122, respectively. Heater element 14 is disposed between fixed shafts 15a, 15b. An axial flange 132a is formed on the end portion of end plate 132 and extends along fixed shaft 15b. A sprocket 21 is fastened on the outer end portion of flange 132a, and is operatively connected with a sprocket 18 fastened on the drive shaft of a driving motor 19 through endless chain 20. Thus, drum 13 is rotatably disposed within container 11.

Coffee beans enter the container through a hole 121a which is formed through end plate 121 and also functions as a hot air outlet hole. A coffee bean discharge hole 121b, also formed on end plate 121, is opened and closed by control plate 22 rotatably fastened on end plate 121. Thus, the roasted coffee beans are discharged from container 11 through hole 121b. An air inlet hole 122a is formed through end plate 122. A blower duct (not shown) in which a blower fan may be disposed can be connected with air inlet hole 122a for promoting the circulation of hot air within container 11.

Figure 2:
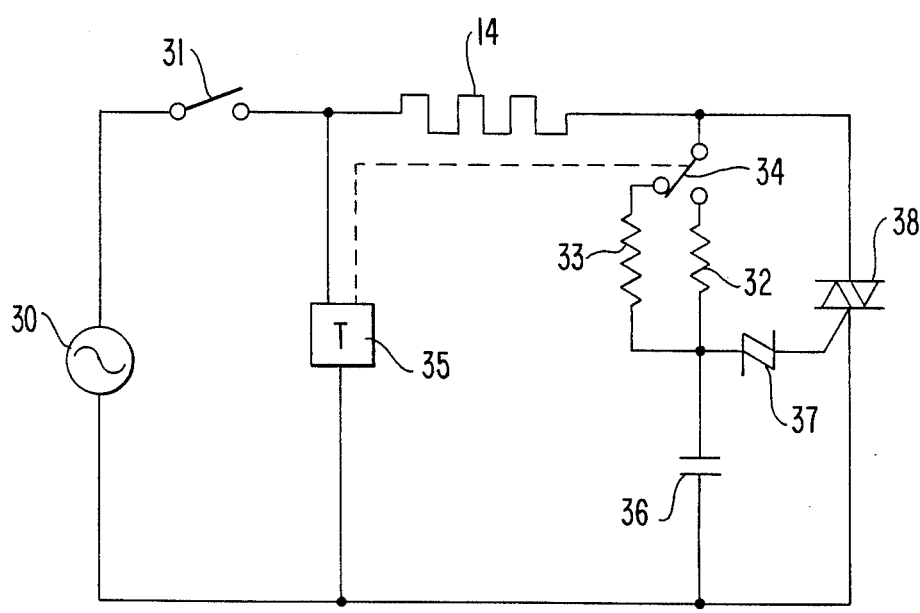
FIG. 2 is an electrical circuit depicting a heater element control device in accordance with one embodiment of the invention.

Referring to FIG. 2, a control device for the heater element will be described. One end of heater element 14 is connected to a standard alternating power source 30 through a main switch 31, and the other end is connected to a pair of parallely connected resistors 32, 33 through a single pole double throw type selecting switch 34. One of the resistors, such as first resistor 32, has a resistance that will provide the normal input voltage for heater element 14 when this resistor is connected by means of switch 34. The second resistor element 33 is designed to have a resistance larger than that of the first resistor element 32. The other end of each of the resistor elements 32, 33 is connected to a condensor 36 which will discharge when its electrical potential exceeds a predetermined level. The other end of each of resistor elements 32, 33 is also connected to a trigger element 37, such as an SBS, which will generate trigger pulses by the discharge of condensor 36.

The end of heat element 14 connected to switch 34 is also connected to alternating switching element 38 which is energized when trigger pulses are input and is deenergized when the electric potential of the alternating voltage wave is zero. Switch 34 is normally connected between heater element 14 and resistor 32. Switch 34 switches to resistor 33 under the control of timer 35. In this embodiment, timer 35 actuates switch 34 after a predetermined time period, for example, ten minutes after the closing of main switch 31.

When the roasting operation is begun, motor 18 for rotating cylindrical drum 13, and heater element 14 is energized. After the temperature in the roasting drum reaches a predetermined temperature, coffee beans are placed in the interior of cylindrical container 11 through hole 121a. The coffee beans are uniformly heated by heater element 14 due to the rotating operation of blades 133. After the roasting operation is completed, the rotating operation of motor 18 is ceased, heater element 14 is deenergized, and roasted coffee beans are discharged through hole 121b.

Figure 3:
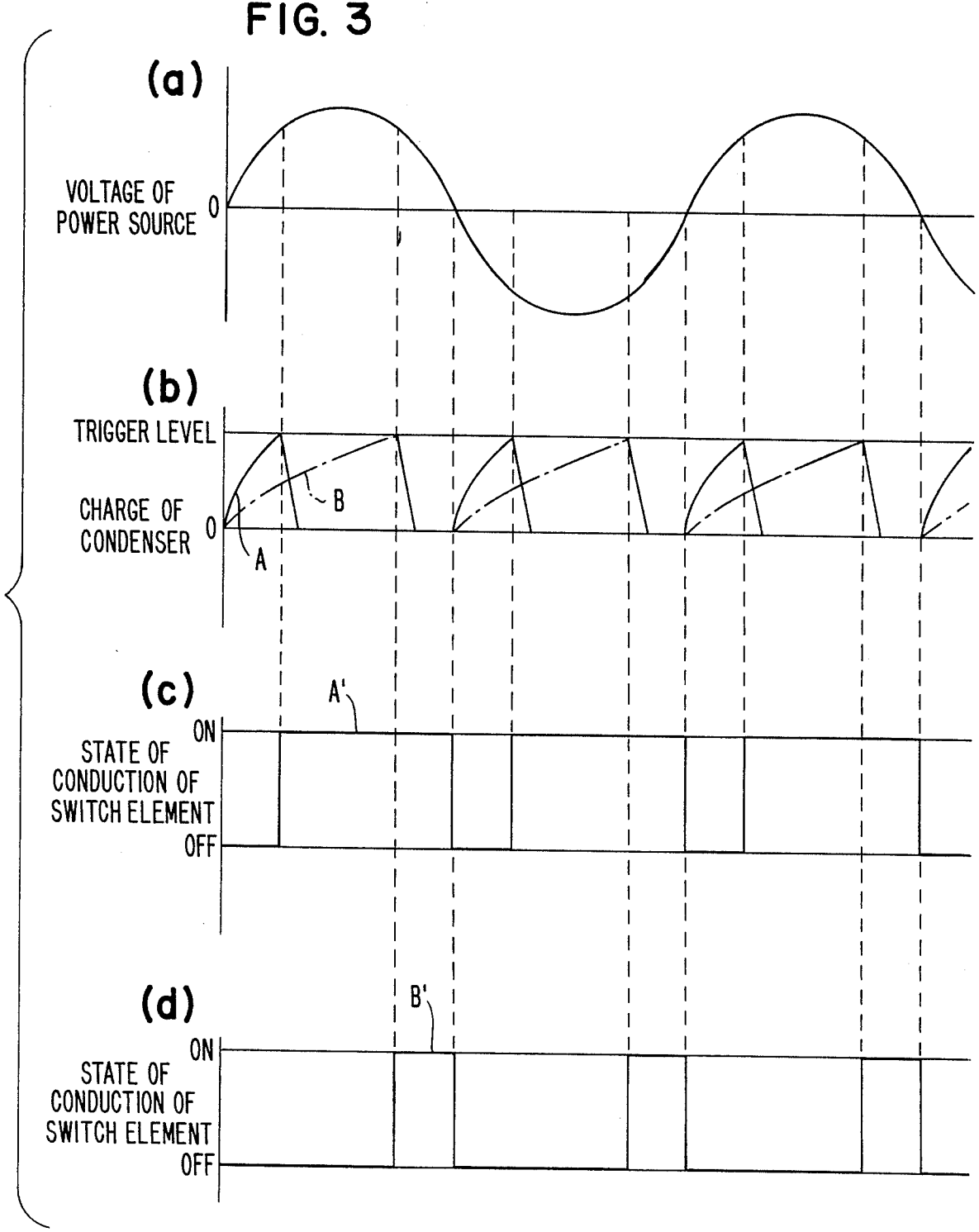
FIG. 3 is a graph illustrating the operation of the control device shown in FIG. 2.

Referring to FIG. 3, the operation of timer 35 and trigger element 36 will be explained. When switch 31 is first closed, switch 34 is connected to resistor 32. Since the resistance of first resistor element 32 is small, the electrical potential of condenser 36 quickly reaches a predetermined level, such as the trigger level of the trigger element (this change of potential of the condensor is shown by curve A in FIG. 3(b), while the voltage of the power source is shown in FIG. 3(a)). After the trigger level is reached, condensor 36 begins to discharge into trigger element 37, and is fully discharged when the voltage of the alternating current source reaches the zero level. The trigger pulse which is generated by the trigger element 37 and shown by curve A' in FIG. 3(c) is input to alternating switching element 38 which will close and result in a large input voltage being supplied to heater element 14. As a result, the calorific value of heater element 14 is high.

After a predetermined time period, such as ten minutes from the closing of main switch 31, switch 34 is activated due to the operation of timer 35 and is now connected to resistor 33. Since the resistance of resistor 33 is larger than that of resistor 32, the electrical potential of condensor 36 is gradually increased to the trigger level of trigger element 37 (this change of potential of condensor 36 is shown by curve B in FIG. 3(b)). The charging time to reach the trigger level is now delayed, as shown in FIG. 3(b). After the trigger level is reached condensor 36 discharges, and is completely discharged when the alternating voltage curve reaches zero. The trigger pulse which is generated by the trigger element 37 and shown by curve B' in FIG. 3(d) is applied to switching element 38. Thus, the large input voltage supplied to heater element 14 is supplied for a shorter time due to second resistor 33. As a result, the calorific value of heater element 14 is varied.

In this embodiment, switch 34 is controlled by the operation of timer 35, however, switch 34 could be controlled by a detecting signal from a thermosensor 24 disposed in the interior of cylindircal container 11 (see FIG. 1).

Figure 4:
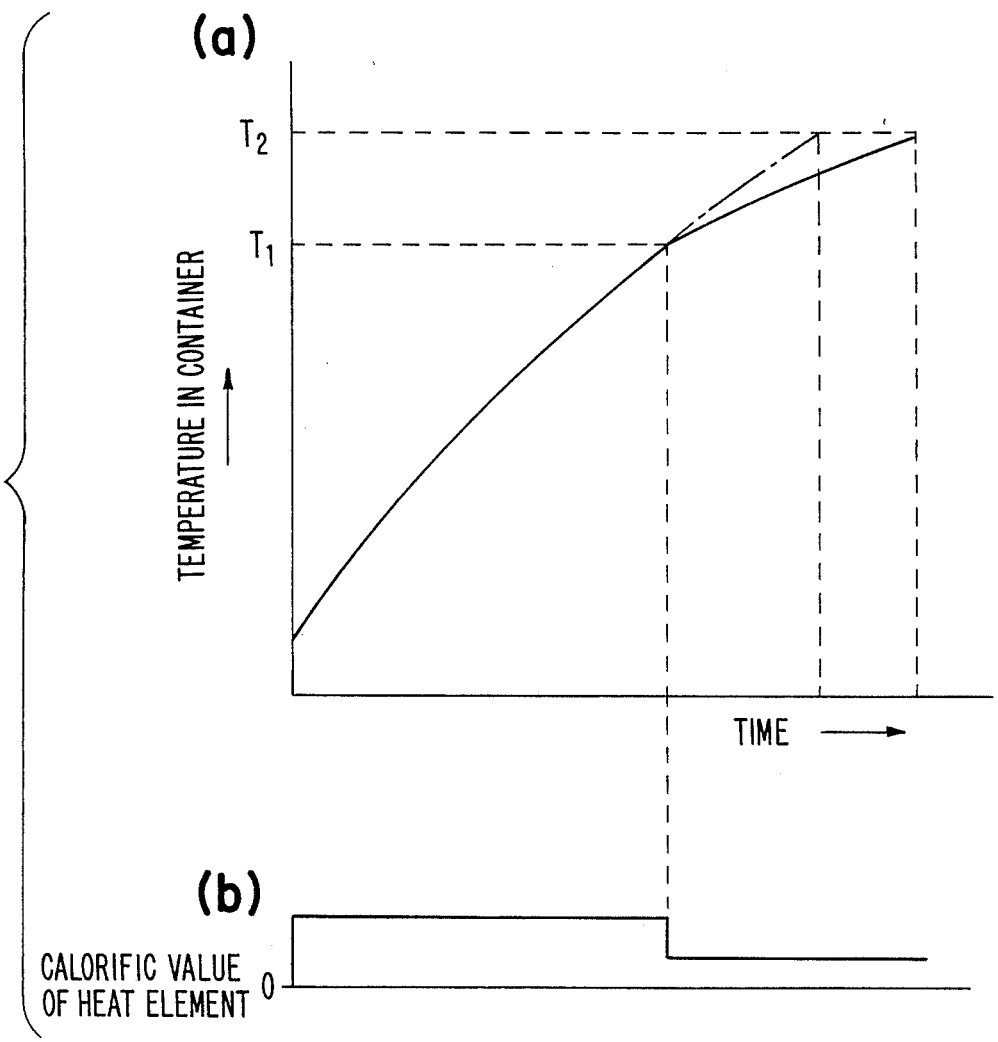
FIG. 4 is a graph illustrating the temperature in the roaster.

As mentioned above, the calorific value of the heater element is controlled by a change of input voltage to the heater element, and is maintained at a high level at the initial stage of the roasting operation so that the temperature in the cylindrical container quickly reaches an appropriate roasting temperature T1 and the coffee beans are roasted by high heat during a short time period. After the temperature in the cylinder container reaches the appropriate roasting temperature level T1, the calorific value of the heater element is reduced. Thereafter, the temperature in the cylinder container is slowly increased to thereby prevent abnormal heating within the cylinder container. That is, as shown in FIG. 4, the time period to reach the temperature level T2 from temperature level T1 is longer than in prior devices. As a result, burning of the skin of the coffee beans is prevented. As shown in FIG. 4(b), the calorific value of the heater element is reduced after the predetermined time period. Precise temperature control in the cylindrical container is further accomplished by controlling the operation of the blower fan.

Figure 5:
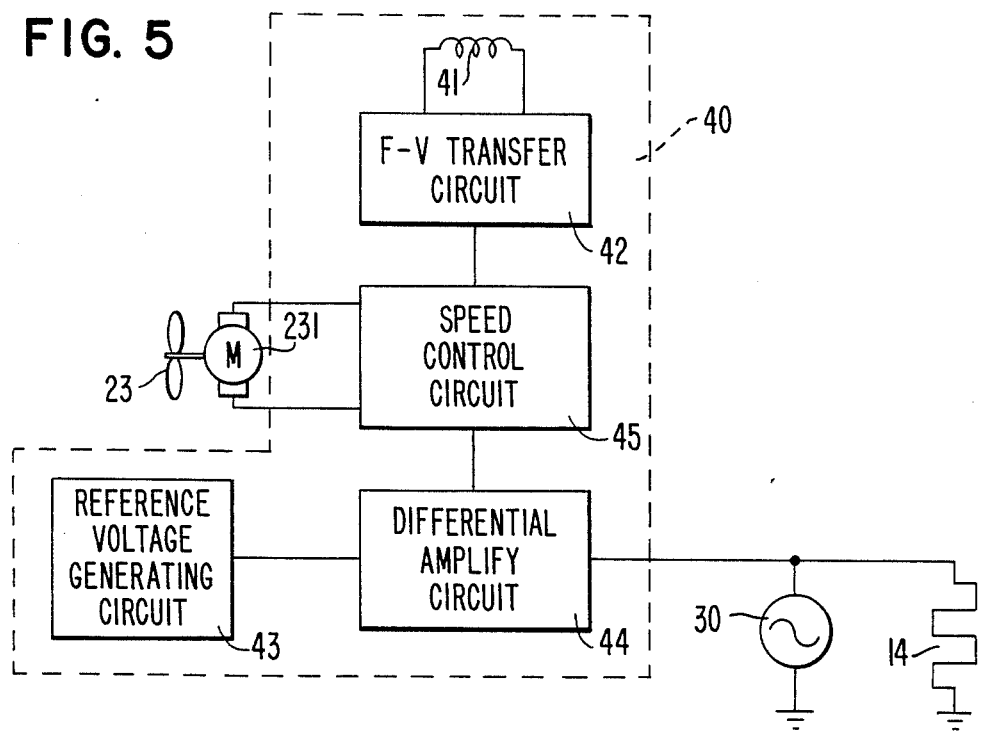
FIG. 5 is a block diagram of a control device in accordance with another embodiment of this invention.

Referring to FIG. 5, the operation of a blower motor will be described. The blower motor operates a blower fan which is disposed in the blower duct and causes hot air circulation within the cylindrical container to more uniformly roast the coffee beans and control the temperature in the container. The rotation speed of the blower is controlled by air flow control circuit 40.

Control circuit 40 comprises a rotation frequency detecting sensor 41, F-V transfer circuit 42 by which the rotation frequency or frequency signal is transferred to a direct current signal, a reference voltage generating circuit 43, a differential amplify circuit 44 and a speed control circuit 45 to which blower motor 231 is connected. The rotation frequency detecting sensor 41 is disposed on the outer peripheral portion of the blower fan 23 to detect the rotation frequency of the blower fan 23, and its detecting signal is input to F-V transfer circuit 42. The direct current signal generated by F-V transfer circuit 42 is input to speed control circuit 45.

Differential amplify circuit 44 is connected in parallel to alternating power source 30 and heater element 14, and is also connected to reference voltage generating circuit 43. This differential amplify circuit 44 detects the difference between the two voltages applied from alternating power source 30 and reference voltage generating circuit 43, and amplifies this difference. The amplified signal generated by difference amplify circuit 44 is input to speed control circuit 45. Speed control circuit 45 controls the rotation frequency of blower motor 231 in response to the signal input thereto.

Figure 6:
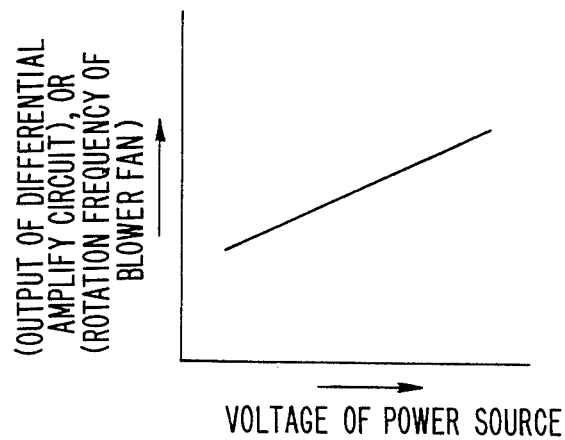
FIG. 6 is a graph illustrating the relationship between output signal or rotation frequency and power source voltage.

The operation of the speed control circuit 45 will be explained with reference to FIGS. 6 and 7. The rotation frequency of blower fan 23 is detected by the rotation frequency detecting sensor 41 and is input to F-V transfer circuit 42.

This rotation frequency signal is transferred to a direct current signal and input to speed control circuit 45.

If the power source voltage applied to heater element 14 exceeds the reference voltage generated by the reference voltage generating circuit 43, i.e., the calorific value of heater element 14 is proportionally increased due to an increase in the power source voltage, the differential amplify circuit 44 amplifies the voltage difference between these two voltages and inputs the difference voltage signal to speed control circuit 45. The rotation speed of blower motor 231 is proportional to the voltage supplied by differential amplify circuit 44 and is, therefore, varied in accordance with changes in the power supply 30. In speed control circuit 45, the input signal from F-V transfer circuit 42 is compared with the input signal from differential amplify circuit 44, and then a signal is outputted to control the rotation speed of blower motor 231. Thus, the rotation frequency of blower motor 231 proportionally increases when the voltage of the power source increases.

Figure 7:
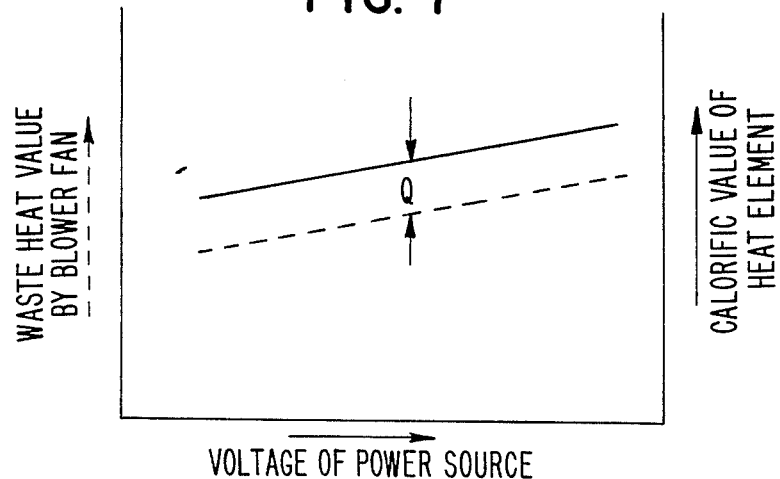
FIG. 7 is a graph illustrating the relationship between the calorific value and blast volume against power source voltage.

The relationship between the rotation frequency, airflow amount and waste heat volume are proportional to one another, thus, the waste heat volume is proportionately increased when the voltage of power source 30 is increased, as shown by the dotted line in FIG. 7. Therefore, even if the calorific value of the heater element is increased due to increases in the voltage of the power source, the waste heat volume is proportionately increased due to the increasing of the rotation frequency of blower motor 231. As a result, the heating value Q supplied to the roasted coffee bean is usually constant, as shown in FIG. 7. Reversely, if the heating value of heater element 14 is decreased, the waste heat value by the operation of blower motor 231 is proportionately decreased.

As mentioned above, the heater element control device is provided with a rotation speed control circuit for controlling the rotation frequency of the blower motor in order to compensate for changes of voltage in the power source. The heating value supplied to the coffee beans is therefore usually constant and optimum roasting conditions are maintained.

This invention has been described in connection with the preferred embodiments, but these embodiments are for illustrative purposes only, and the invention should not be construed as limited thereto. Although the control devices described herein have been illustrated in the environment of a coffee roaster, it should be apparent that the controlling apparatus could be used to control any heating or roasting device. It should be apparent to those skilled in the art that other variations or modifications can be made without departing from the spirit of the invention or the scope of the appended claims.

We claim:

1. A roasting apparatus for roasting coffee beans and the like comprising:
    a container to hold the material to be roasted;
    a heater element to heat the material;
    a power source connected to said heater element;
    a blower device for circulating air within said container;
    first controlling means for controlling the calorific value of said heater element during a roasting cycle to reduce the calorific value from a first positive value to a second positive value when the temperature within said container reaches a predetermined temperature; and
    second controlling means for controlling the rate at which said blower device circulates air within said container, said second controlling means increasing the rate at which air is circulated by said blower device in response to an increase in the value of said power source, and decreasing the rate at which air is circulated by said blower device in response to a decrease in said power source.

2. A roasting apparatus according to claim 1 wherein said first controlling means comprises a first resistor element of a first value, a second resistor element of a second value different than said first value and connecting means for connecting either said first resistor element or said second resistor element in series with said heater element such that the voltage applied to said heater element varies depending upon which of said resistors is connected by said first connecting means.

3. A roasting apparatus according to claim 2 wherein said first controlling means further comprises a condensor connected in series with said first and second resistor elements, an alternating switching element connected in parallel across said condensor and said resistor elements and a trigger device connected between said condensor and said switching element such that said condensor will discharge during certain intervals and cause said trigger device to activate said alternating switching element which will produce a zero voltage level across said series combination of said resistor and said condensor to thereby increase the voltage across the heater element.

4. A roasting apparatus according to claim 3 wherein the time interval during which said condensor is discharging will vary depending upon which of said resistor elements is connected to said heater element.

5. A roasting device according to claim 2 wherein said connecting means is controlled by a timer device.

6. A roasting device according to claim 2 wherein said connecting means is controlled by a thermosensor disposed in the interior of said container.

7. A roasting device according to claim 2 wherein said connecting means is a switch.

8. A roasting apparatus for roasting coffee beans and the like comprising:
    a container to hold the material to be roasted;
    a heater element to heat the material;
    a power source connected to said heater element;
    a blower device for circulating air within said container; and
    controlling means for controlling the rate at which said blower device operates to thereby control the rate at which air circulates within said container, said controlling means increasing the rate at which air is circulated by said blower device in response to an increase in said power source, and decreasing the rate at which air is circulated by said blower device in response to a decrease in said power source.

9. A roasting apparatus according to claim 8 wherein said blower device comprises a blower fan and a motor connected to said fan.

10. A roasting device according to claim 9 wherein said controlling means varies the speed of said motor.

11. A roasting device apparatus for roasting coffee beans and the like comprising:
    a container to hold the material to be roasted;
    a heater element to heat the material;
    a power source connected to said heater element;
    a blower device for circulating air within said container;
    first controlling means for controlling the calorific value of said heater element to reduce the calorific value from a first positive value to a second positive value when the temperature within said container reaches a predetermined temperature;

said first controlling means comprising a first resistor element of a first value, a second resistor element of a second value different than said first value and connecting means for connecting either said first resistor element or said second resistor element in series with said heater element such that the voltage applied to said heater element varies depending upon which of said resistors is connected by said connecting means, and further comprising a condensor connected in series with said first and second resistor elements, an alternating switching element connected in parallel across said condensor and said resistor elements and a trigger device connected between said condensor and said switching element such that said condensor will discharge during certain intervals and cause said trigger device to activate said alternating switching element which will produce a zero voltage level across said series combination of said resistor and said condensor to thereby increase the voltage across the heater element; and second controlling means for controlling the rate at which said blower device circulates air within said container, said second controlling means increasing the rate at which air is circulated by said blower device in response to an increase in the value of said power source, and decreasing the rate at which air is circulated by said blower device in response to a decrease in said power source.

12. A roasting apparatus according to claim 11 wherein the time interval during which said condensor is discharging will vary depending upon which of said resistor elements is connected to said heater element.

13. A roasting device according to claim 11 wherein said connecting means is controlled by a timer device.

14. A roasting device according to claim 11 wherein said connecting means is controlled by a thermosensor disposed in the interior of said container.

15. A roasting device according to claim 11 wherein said connecting means is a switch.

* * * * *